March 23, 1943. T. FECKER 2,314,487
TRANSMITTER
Filed Feb. 12, 1941 2 Sheets-Sheet 1

Inventor
THEODOR FECKER
By H. S. Snover
Attorney

Inventor
THEODOR FECKER

Patented Mar. 23, 1943

2,314,487

UNITED STATES PATENT OFFICE 2,314,487

TRANSMITTER

Theodor Fecker, Berlin, Germany, assignor to General Electric Company, a corporation of New York Application February 12, 1941, Serial No. 378,523
In Germany February 4, 1939

4 Claims. (Cl. 179—171)

This invention is concerned with a circuit organization designed to improve the efficiency of medium-frequency or high-frequency tube transmitters, more particularly, impulse-controlled push-pull tube transmitters. The innovation is that a choke coil is included between the direct current source of supply and the oscillation circuit representing the load, and that control action is brought upon the transmitter tubes by a preferably rectangular grid control potential in such a way that the alternations of plate current are more or less rectangular and that they preferably have a stable current strength roughly corresponding to the current carrying capacity of the tube. The invention is of value in transmitters because, as is well known, a square wave delivers more energy than any other shape wave of the same duration and peak value. Thus, if peak value of plate pulse is not to exceed certain allowable tube rating, and duration is to be small so as to get high efficiency, then maximum power will be delivered by a squarish pulse. My invention concerns a new means for providing this square wave efficiently.

In describing my invention in detail, reference will be made to the attached drawings wherein.

In valve or tube transmitters working with electron tubes, especially push-pull power tube arrangements, the efficiency as well known is governed to a considerable degree by the dissipation of the electron tubes themselves. A reduction of the dissipation becomes particularly important in cases where the load capacity of tubes is to be pushed to the uttermost limit. A case of this kind arises in connection with the generation of brief transmitter impulses of the highest possible power. In order that the impulse energy of the impulses modulated by medium or high frequency may be pushed to an extreme point a very high tube load is permissible because of the comparatively great impulse duration, the produced power naturally being a function of the utilization thereof throughout the length of the impulse.

In arrangements of this nature, therefore, the aim is as stable as possible a current strength throughout the duration of the impulse and thus also for each individual alternation of the keyed frequency. At first sight this would appear impossible for, as will be seen from the diagram Fig. 1 which applies to a conventional valve transmitter circuit organization of a kind shown in Fig. 2, in the presence of rectangular plate current $ia!$ the dissipation $Va$ of the tubes $10$ for a semi-cycle would have a very uneconomical shape insofar as at the beginning and towards the end of the semi-cycle it would be required to have far higher values than in the intermediate value or crest. This shape follows from the time change of the tube potential between anodes $14$ and cathodes $16$ which consists of the difference between the direct current voltage $U=$ of the source of direct current potential supply and the alternating potential $U \approx$ which adjusts itself at the oscillatory circuit $20$ forming the load in the plate circuit of the valve arrangement. The aggregate loss or dissipation conditioned thereby is very liable to assume large proportions so that the efficiency drops far below the 50 percent level.

Another cause for loss in efficiency may be based upon the fact that the time interval of a rectangular current in each semi-cycle of transmitted frequency is restricted to a comparatively narrow range in the neighborhood of the crest value of the voltage curve. In this case, of course, the dissipation of the tube will not reach high instantaneous values. But operation of this kind inheres the drawback that the current during such abbreviated period of current flow would have to have a correspondingly higher amplitude if the same total power is to be obtained. Equal power at the same tube dissipation would thus have to be secured with higher tube load, in other words, by the use of larger and more powerful transmitter valves.

Figure 3:
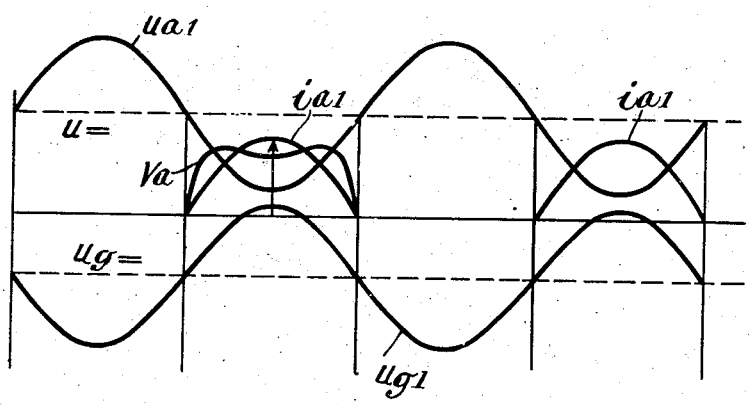
Figs. 3 and 5 are graphs illustrating the manner in which systems of the type shown in Fig. 2 operate when modified in accordance with my invention.

On the other hand, it is also conceivable that by sine-wave control of the tubes the plate current $ia!$ is lowered towards the beginnings and ends of the semi-cycles as compared with its maximum instantaneous values. Such kind of control action would be readily possible also by application to the grids $22$ of a suitably dimensioned sinusoidal grid alternating potential $ug!$ optionally in combination with a blocking grid direct current potential $ug=$. As shown in diagram (Fig. 3) this, to be sure, results in a tube dissipation $Va$ which is a function of the time, and is improved as compared with the tube dissipation Vd shown in Fig. 1. In this case there is the drawback that the current-carrying capacity of the tubes pushed to a particularly high level under certain circumstances cannot be fully utilized for the production of useful or signal power for the reason that the plate current must always be lowered under the value corresponding to the load-carrying capacity of the tube.

Now, the aim and purpose of the invention is to combine satisfactory utilization of the tube with the lowest possible dissipation and to thereby assure, with a given tube, actually the highest possible useful energy in the presence of the lowest possible input energy; or inversely, for a given useful power, to get along with the lowest possible dimensions for the energy source and transmitter tubes, that is, the lowest cost and weights of the circuit elements.

Figure 1:
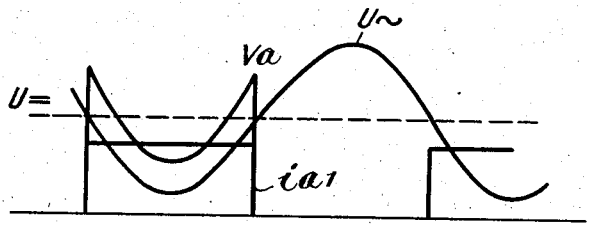
Fig. 1 is a graph illustrating the operation of a known form of wave signalling system which is illustrated in Fig. 2.
Figure 2:
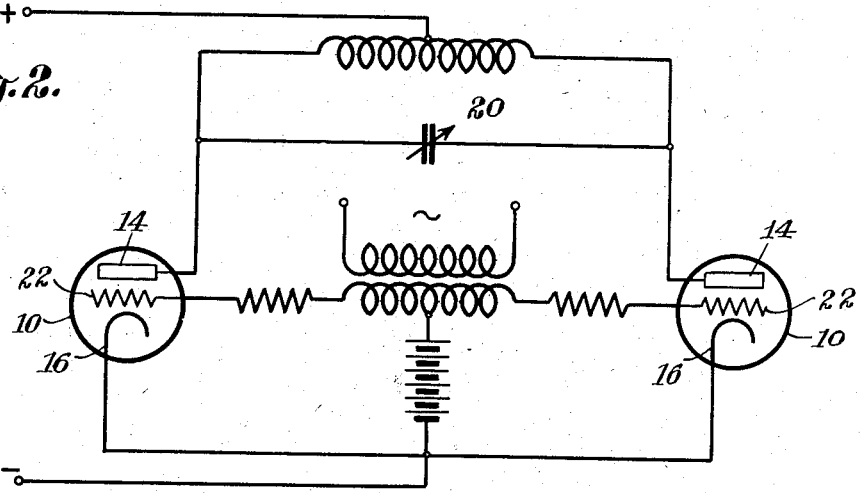
Figure 4:
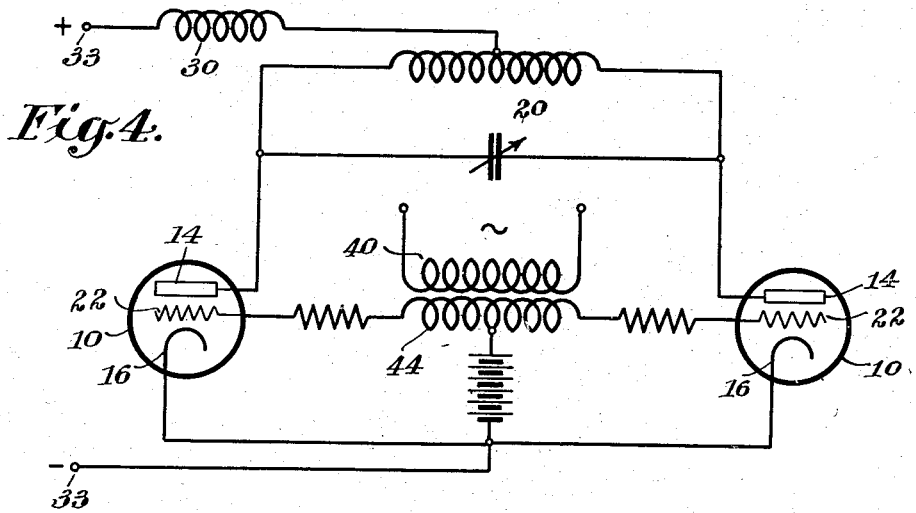
Figs. 4 and 6 illustrate two modifications of wave generating systems arranged in accordance with my invention.
Figure 5:
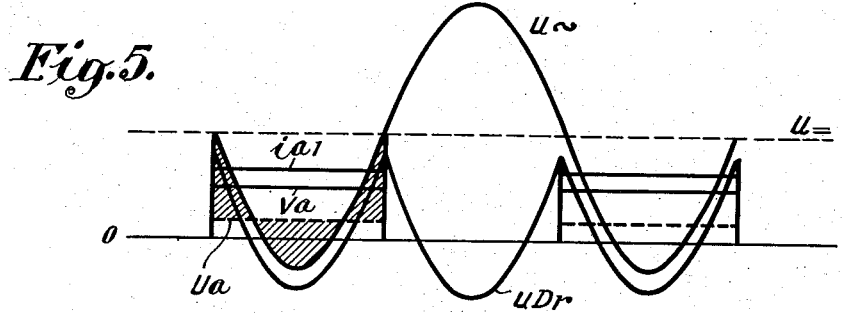

According to the invention this problem is solved, as illustrated in Fig. 4, by inserting a buffer choke 30 in the plate circuit 20 of the circuit organization of the transmitter between the direct current voltage source of supply 33 furnishing the plate energy and the oscillatory circuit 20 which delivers the produced alternating current energy. The said choke coil 30 according to the sense and purpose of the invention takes up the voltage differences between the direct current potential supplied from source 33 and the alternating potential of the oscillatory circuit 20 with the result that the potential at the transmitter valves is practically stabilized; that is, roughly in accordance with the value of the tube potential (Fig. 1). In connection therewith the invention provides for the full swing or drive of plate current at constant amplitude throughout each semi-cycle, for instance, by the aid of a rectangular grid control alternating potential applied by the winding 40. Since thus both the plate current as well as the plate potential may simultaneously be of rectangular form, the dissipation which thus results will be comparatively low and practically constant throughout the semi-cycle. In other words, the efficiency will reach the highest possible value. But, also, the overall efficiency of the whole transmitter arrangement is raised in direct proportion to the tube utilization; in other words, with the same crest current values, within the same impulse duration, by a circuit organization according to the invention, larger powers can be handled and be delivered by the oscillator than has been feasible with circuit organizations previously described. The situation and conditions resulting in a circuit arrangement of the invention as to the rest are illustrated by the graphs of Fig. 5 especially voltage Udr arising in choke coil 30. These graphs will be readily understandable in the light of what has been stated by reference to Figs. 1, 2 and 3.

Figure 6:
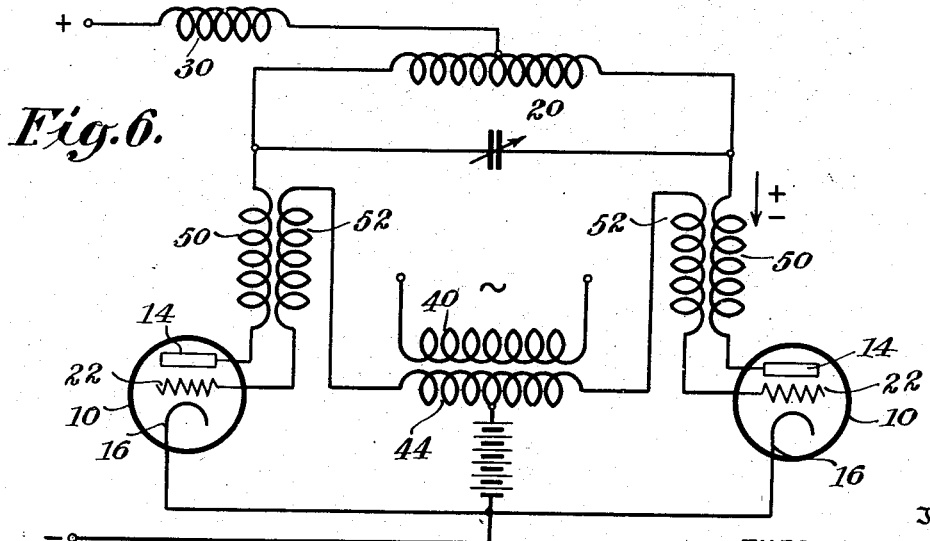

The increase in efficiency which, under certain circumstances may be very appreciable by adopting the invention, could also be described in this way that of the effective dissipation occurring in the conventional circuit organization necessarily in the form of plate dissipation, a large part is converted into wattless power of the choke coil and thus has no effect any longer upon the efficiency. The operation of the transmitter equipment as to the rest, is well known in the art, that is to say, both tubes of the push-pull connection operate alternately having their grids 22 connected and excited in phase opposition by winding 44. Because of the control action here provided, the plate currents alternate abruptly with the result that the sum total thereof becomes practically a direct current which is invariable throughout the whole impulse length. Such control action is obtainable by using rectangular grid voltage curves or else by a grid alternating potential at least resembling this form. However, there are also other ways and means adapted thereto, for instance, current feedback by means of coupling inductances 50 and 52 in the plate and grid circuits respectively with the plate circuits carrying rectangular semi-currents as indicated in purely schematic form in Fig. 6. In this modification the action of the choke 30 as described above is supplemented by the feed-back action of windings 50 and 52. The choke 30 again squares up the pulses at the outputs so that they are more nearly of square wave form rather than peaked as shown at ia1 of Fig. 3. The feed-back at 50 and 52 boosts the excitation voltage on the grids 22 and 24 to further square up the excitation voltages on the grid, which, as stated hereinbefore, may be of sinewave, or, better yet, of square-wave form, such as, high frequency pulses such as obtained by keying a high frequency generator coupled to the input winding of 40.

It will be noted that the invention offers very great advantages above all in connection with the operation of impulse transmitters for the reason that it insures an increase in efficiency without an incidental impairment in the extreme utilization of the high load-carrying capacity of the tubes inside brief periods of time. In the last analysis the invention, therefore, is adapted to the production of extremely high impulse powers by means of small direct current energies and transmitter valves utilized to the fullest limit. By using the basic idea of the invention increases of efficiency of 100 and more percent are possible compared with the performance obtainable without the invention.

What is claimed is:

1. In a radio frequency amplifier system, a pair of electron discharge tubes each having an anode, a cathode, and a control grid, means for impressing wave energy of square wave form in phase opposition on said control grids, an oscillatory circuit connected with said anodes, and means for supplying substantially constant direct current to the anodes of said tubes.

2. In an amplifier system, a pair of electron discharge tubes each having an anode, a cathode, and a control grid, means for impressing wave energy of square wave form in push-pull relation on said control grids, an oscillatory circuit including an inductance connecting said anodes in push-pull relation, a direct current source having a negative terminal connected to the cathodes of said tubes, and a choke coil connecting a positive terminal of said source to a point on the inductance of said oscillatory circuit for supplying substantially constant direct current to the anodes of said tubes.

3. In a radio frequency amplifier system, a pair of electron discharge tubes each having an anode, a cathode, and a control grid, a radio frequency circuit connecting the control grids of said tubes in push-pull relation, connections for impressing wave energy of square wave form in phase opposition on said control grids, an alternating current circuit including an inductance connected between the anodes of said tubes, means for maintaining all points on said alternating current circuit at radio frequency potential and for supplying substantially constant direct current to the anodes of said tubes, including a radio frequency choke coil and a source of potential connected in series between a point on said inductance and the cathodes of said tubes.

4. In an amplifier system, a pair of electron discharge tubes each having an anode, a cathode, and a control grid, means for impressing wave energy of substantially square wave form in push-pull relation on said control grids, an alternating current circuit including reactances tuned to the frequency of the said wave energy connected between the anodes of said tubes, connections including an inductance of high impedance to wave energy of the frequency of said impressed wave energy for connecting a source of direct current between the anodes and cathodes of said tubes, said connections and inductance serving to supply substantially constant direct current to the anodes of said tubes, and a regenerative coupling between the anode and the control grid of each of said tubes.

THEODOR FECKER.